July 4, 1967   A. O. ADAMS ET AL   3,329,791
INTEGRAL TERMINAL PIN CONTACT STRUCTURE FOR RELAYS
Filed June 1, 1965
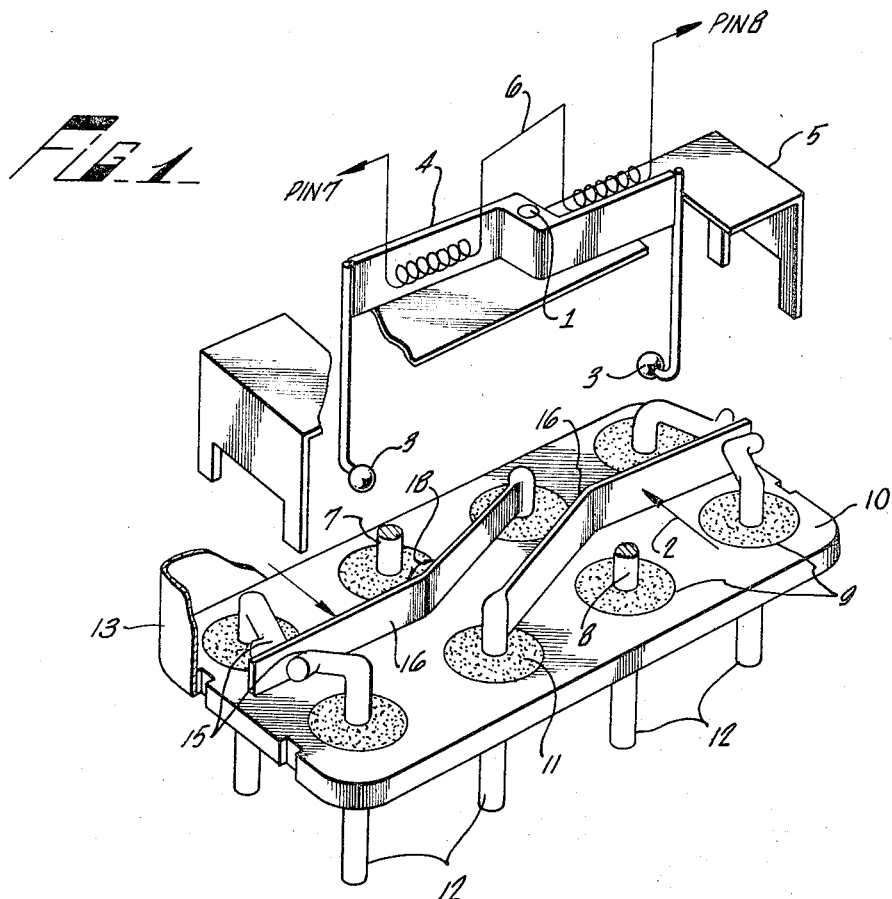
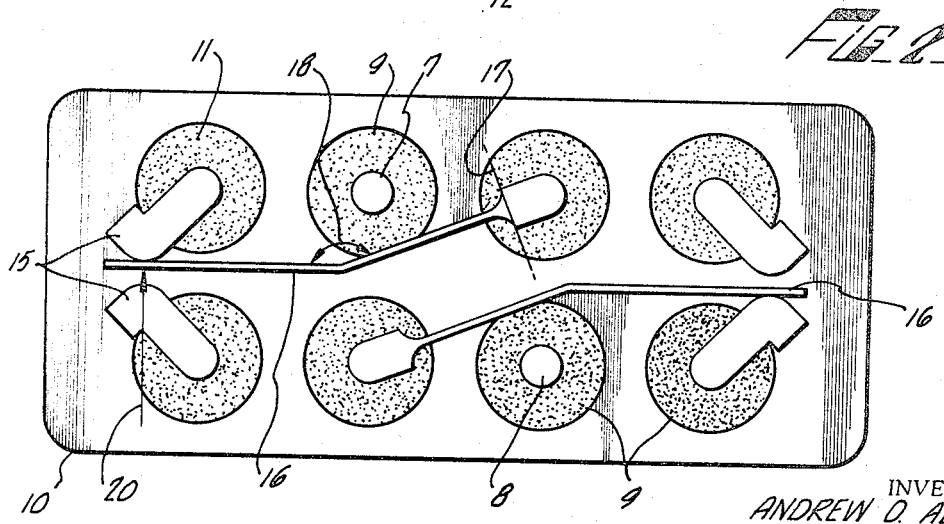
INVENTORS.
ANDREW O. ADAMS
MARVIN G. NELSEN
BY
Christie, Parker & Hale
ATTORNEYS.

United States Patent Office 3,329,791
Patented July 4, 1967

3,329,791
INTEGRAL TERMINAL PIN CONTACT
STRUCTURE FOR RELAYS
Andrew O. Adams, Inglewood, and Marvin G. Nelsen,
La Canada, Calif., assignors to Leach Corporation, San
Marino, Calif., a corporation of Delaware
Filed June 1, 1965, Ser. No. 460,011
13 Claims. (Cl. 200—166)

This invention relates in general to a relay contact and wiper blade assembly, its method of fabrication and, more particularly, relates to a relay structure having both the contacts and wiper blade fabricated directly as integral units from the terminal pin wires housed in a header assembly.

A relay header and contact structure of the prior art has, prior to the date of this invention, generally included a support plate, commonly referred to as a header, which served to house, in insulating beads, a plurality of terminal wires. These terminal wires extend straight through the header surface and outwardly both above and below it. The lower pin extensions provide an electrical material for connection to various circuit portions in which the relay contacts are to operate as normally-open or normally-closed switches, and are also available for connection to standard relay coils and energizing sources in a manner well known in the art.

The terminal wires extending above the header plate were made available for a series of welding operations, which are characteristic of the prior art and are required to mate a separate wiper blade and support bracket to one of the terminals. This characteristic welding operation is also required to join separate relay contacts to their appropriate posts. These terminal wires are normally of stainless steel material with an oxide coating, and such material is not readily susceptible to standard welding techniques. In addition, the wiper blade for prior art relays is normally a high tensile strength material composed, for example, of silver, magnesium and nickel, which material also is not readily susceptible to standard welding techniques. Attempts to weld a wiper blade directly to its terminal pin have in general failed because of the resistance to welding by both the pin and blade. Not only is it difficult to achieve a sound weld, but this prior art approach suffers from a further disadvantage, and that disadvantage is that the blade material at the point of welding crystallizes from the heat and from the repeated closing and opening of the relay circuit during use. Accordingly, such prior art relay assemblies are subject to early breakage and have a short wear life.

Attempts in the past have been made to alleviate the difficulty of welding two generally weld-resistant materials by utilizing a flat weld bracket having one end of the wiper blade sandwiched and press fit between this bracket. The weld bracket is chosen from a material that is more readily susceptible to welding than the wiper blade. This prior art approach alleviates to a certain degree the breakage from crystallization of the wiper blade but is still generally unsatisfactory in that each contact-wiper blade assembly requires several parts which must be formed and handled numerous times in addition to handling during the welding operation. Further, the weld bracket, although chosen from a material susceptible to welding, often exhibits a poorer electrical conductivity than the pin and the wiper blade and thus the overall electrical conductivity of the circuit is reduced.

Finally, the fact that the prior art approach requires any welding at all is highly objectionable in that it is difficult to achieve proper orientation for the contacts and the wiper blade because the point of weld consists of the round weld-resistant terminal wire being joined to a flat weld bracket. Poor contact pressure and misalignment are often common results of this prior art welding approach. Additionally, the weld operation itself develops weld splattering, which splattering often breaks loose after the relay is put in use and interferes with the electrical circuits or becomes an impeding obstacle preventing proper mechanical relay contact closures and openings between the wiper blade arm and contact surfaces.

The foregoing disadvantages of the prior art are avoided by the principles of this invention in which a relay contact-wiper blade assembly is fabricated entirely free of any welding processes and eliminates any additional parts other than terminal pins, insulating means and a support structure. In accordance with the principles of this invention, a weld-free relay contact structure comprises a support plate for housing insulated terminal pins passing through the plate and extending outwardly beyond its surface plane, and further comprises at least one relay contact-wiper assembly formed directly as integral parts of the outwardly extending portions of the terminal pins. These terminal pins are bent at substantially right angles until they lie in a plane parallel to the support plate and form in that plane a gapped contact surface area with a biased flattened wiper-arm blade positioned in the gap touching one contact surface. In addition to elimination of unnecessary parts and handling required in the prior art assembly, the foregoing defined relay structure and the method of fabrication of this invention presents an improved electrical conductivity inasmuch as the contact surface area—contact terminals combination; and the wiper blade—wiper blade terminal combination; are each one integral piece of a high electrical conductivity material. This high conductivity material, for example, may be an alloy of silver, magnesium and nickel of the type known as Handy and Harman alloy 995. This particular alloy and others of similar composition have proved particularly applicable, but are not to be taken as limiting the principles or scope of this invention.

The foregoing features and principles of this invention may be more fully appreciated by reference to the accompanying drawing, in which:

FIG. 1 is a perspective view of an integral relay terminal pin-contact structure embodying the principles of this invention and includes an exploded perspective of a typical contact moving device; and FIG. 2 is a top view of the relay structure of FIG. 1.

In FIG. 1, a support plate, or relay header 10 is shown provided with a plurality of openings 9 for housing terminal pins 12 which pass through insulators 11. Exploded away from the support plate 10 is an electrically actuated coil 6 and armature assembly 4 for mechanically breaking the normally closed contacts formed by wiper blades 16 and one contact of each contact pair 15. It should be understood that any contact moving device known in the art could be employed and the coil and armature device of FIG. 1 is merely a typical means for selectively controlling movement of the wiper blade arms 16.

Armature 4 is of any well known magnetic material and current flow which may be selectively applied via terminal pins 7 and 8, in any well-known manner, produces a counter-clockwise rotation of armature 4 about pivot pin 1 which is mounted in bracket 5. Attached to the opposite ends of armature 4 are two downwardly extending insulated force balls 3. These insulated balls 3 apply forces, upon actuation of coil 6, to wiper arms 16 in the direction of arrow 2. The rotation of armature 4 travels sufficiently far to alter the normal contact conditions which exist when the relay is in a de-energized state.

The relay described above is a double-pole, double-throw relay. The principles of this invention are not limited, it should be understood, to any particular type or size relay, as they are applicable to a single-pole, single-throw relay and to multiple-pole, multiple-throw relays of various sizes. The size and pole requirements are dependent upon the particular circuit application that is desired.

The insulating material 11 surrounding each of the terminal pins 12 for the stationary contacts 15 and the moveable contacts, or wiper blade arms 16, and the insulating material for terminal pins 7 and 8 as well, may be of a glass seal or any other satisfactory insulator well known in the art. This insulator should achieve an air tight glass to metal bond so that a covering 13 (shown partially broken away in FIGURE 2) can be soldered, or otherwise hermetically sealed, to support plate 10. The support plate 10 is also well known in the art, and may be a flat cold-rolled steel plate which is readily available for this hermetic sealing operation. During the assembly operation bracket 5 is fastened by soldering or otherwise to its receiving slots in support plate 10. Thereafter the relay may be evacuated to a regulated pressure and sealed at that pressure if necessary.

Directing attention to the one contact-wiper blade assembly depicted at the left of FIG. 1, such an assembly includes a pair of contact surfaces 15, and a wiper blade 16 positioned between the rounded corners of the contact pair 15. Each surface of the contact 15 and its terminal pin 12, and the blade 16 and its terminal pin 12 as well, constitute separate integral parts of the portions of terminal pins 12 extending outwardly from the surface plane of support plate 10. These three terminal pins 12 are bent substantially at right angles to the axis of the pin passing through insulator 11 so that they lie in a single plane hereinafter referred to as a contact plane. The pair of contact surfaces 15 is also shaped into their depicted rounded surfaces by another substantially right angle bend in the contact plane in opposite directions for each to provide make-and-break contact surfaces for wiper blade 16. These rounded make-and-break contacting surfaces 15 provide for a better and more reliable electrical contact which is achieved between the flat wiper-blade arm 16 and one of the rounded contact surfaces 15.

Wiper blade 16, similar to each one of the contact pair 15, is also an integral part of an upwardly extended portion of a terminal pin 12. Wiper blade 16 is initially flattened and trimmed in the desired shape. This desired shape may include an angle 18 in the flattened wiper blade 16 which acts as a spring bias for holding blade 16 in a normally closed, or touching, position at one of the contacting surfaces such as the rearmost contact surface 15.

Reference to FIG. 2 which is a top view of FIG. 1, discloses that the flattened area of wiper blade 16 extends from its tip only up to line 17. This line 17, as shown, is beyond the substantially right angle bend in the upper portion of terminal pin 12 immediately above insulator 11. Thus, the portion of pin 12 which forms this first angle retains its round shape on insulator 11 for added strength and support. In a similar manner the right angle bends in the upper portions of the contact pair 15 are retained as near as possible in their rounded shape for added strength and support.

The wiper blade bias mentioned hereinbefore is indicated in FIG. 2 by arrow 20. This bias is on the side of blade 16 having the smallest angle formed at the bend in wiper blade 16.

The materials for the integral terminal wire-contact assembly of this invention may advantageously be any high conductivity metal of high tensile strength which does not soften during subsequent heating operations. A heating operation is required, for example, after the terminal pins have been pre-shaped, to bond each terminal pin 12 to the support plate 10 by a glass insulator bead 11. One typical material which we have discovered to be particularly suitable is a high conductivity alloy having a predominant base of silver and having minute parts of nickel and magnesium. For example, such an alloy may be alloy 995 mentioned hereinbefore and having a nominal composition of 99.4% Ag, .25% Ni, and .25% Mg. One other particularly suitable material, from many possible ones, may be alloy D63X, produced by P. R. Mallory Company. These alloys are commercially available in a cold-rolled condition and are readily susceptible to the necessary bending, flattening and trimming operation required to form contacts 15 and to form wiper blade 16 of this invention. After any such suitable alloy has been fabricated into its desired configuration by shaping operations it may be permanently hardened by an oxidation treatment well known in the art. In case of either of the designated alloys the magnesium, which is in solid solution in the silver, is converted into magnesium oxide. Once the wiper blade 16 and the contact pair 15 are pre-formed to their desired shapes and have been oxidized and hardened, small insulating beads 11, such as Corning glass beads or other types well known in the art, are strung one each on each terminal pin 12. Thereafter the beads with the pre-shaped terminal pins in place are seated in their appropriate apertures in plate 10. The entire assembly is then held in a boat or jig and is heat-treated in a controlled atmosphere furnace which, as is well known in the art, prevents any deterioration in the oxidized coating of the alloy materials. When heated to the curing temperature of the beads, a bond is formed between the support plate 10 and each piece of the integrally formed relay contact-terminal pin assembly 15 and 16. This final heating operation does not deteriorate the previously hardened materials nor does it adversely affect the oxidation coating mentioned above, and such materials retain their original high electrical conductivity and a high tensile strength. The complete assembly thus is not subject to any life limiting hinge point, or disadvantageous handling and welding operations such as are exhibited by previous prior art relay contact structures.

It should be understood, of course, that the foregoing method and apparatus, as described, is merely exemplary of the principles and features of this invention and numerous variations may be designed by those skilled in the art without departing from the spirit and scope of this invention.

What is claimed is:

1. A relay contact structure comprising a metallic support plate; a plurality of terminal pins; glass seals insulatively housing the terminal pins which pass through the plate and extend outwardly from its upper surface plane; and at least one stationary and movable contact assembly integrally formed as weld and solder-free continuations of the outwardly extending portions of at least a pair of the terminal pins, said stationary contact of said assembly comprising a contact area itself formed by the bent part of a rounded bend in one terminal pin with the contact area lying in a contact plane spaced from and parallel to the surface of the support plate, and said movable contact comprising a flattened contact blade itself formed from another terminal pin and having its flattened portion lying in a plane transverse to said contact plane with one side of said flattened blade movably positioned for engagement and disengagement with the contact area formed by the rounded bend of the terminal of said stationary contact.

2. A relay structure in accordance with claim 1 wherein said stationary contact comprises a pair of contact surfaces spaced apart in said contact plane and each including a separate rounded contact area itself formed by the bent part of a substantially right angle bend in one terminal pin, said contact surface pair further having the right angle bends forming said pair of contact surfaces facing in opposite directions from each other with the bent parts forming a gapped stationary contact pair.

3. A relay structure in accordance with claim 2 wherein said flattened contact blade lies in a plane transverse to said contact plane with the flattened sides thereof movably positioned between the rounded contact areas formed by the oppositely facing right angle bends in the stationary contact terminals, said flattened blade arm being bent at a biasing angle toward one of the rounded contact areas for normally maintaining a closed contact condition at that one staiontary contact.

4. A relay structure in accordance with claim 3 wherein all of said terminal pins forming the stationary and movable contact assembly are retained in their normally round shape at the point of entry into the glass seals of the support plate.

5. A relay structure in accordance with claim 4 wherein said terminal pins forming the stationary and movable contact assembly are of a highly electrically conductive alloy material which is predominately a silver base containing sufficient manganese to form a magnesium oxide coating over the surface of the terminal pins, which coating extends into the glass seals and forms a substantially airtight seal therewith.

6. A relay structure in accordance with claim 5 and further comprising a housing hermetically sealed to said header plate and covering said stationary and movable contact assembly.

7. A rclay structure comprising a substantially flat metallic header plate with a plurality of openings therethrough; a plurality of terminal pins extending through said openings and having exposed portions extending outwardly above the header plate; compression seals insulatively housing each terminal pin in a substantially airtight seal formed at an opening in said header plate; a stationary contact structure formed integrally as a weld and solder-free continuation of the outwardly extending portion of at least one of said terminals, said stationary contact structure including a contact area formed by a rounded bend in the terminal itself with said contact area lying in a contact plane which is parallel with and above the upper surface of the header plate; a movable contact blade formed integrally from an upwardly extending portion of another terminal pin, said movable contact blade comprising a flattened end portion lying in a plane transverse to said contact plane with a flattened side thereof positioned for engagement and disengagement with the rounded contact area of said stationary contact; and a selectively energizable coil and armature means electrically connected to another terminal pin and mechanically coupled to said movable contact blade for selectively engaging and disengaging the movable contact with the stationary contact.

8. A relay structure in accordance with claim 7 and further comprising a housing hermetically sealed to said header plate and covering said stationary and movable contacts and said coil and armature means.

9. A relay structure comprising a substantially flat metallic header plate with a plurality of openings therethrough; a plurality of terminal pins extending through said openings and having exposed portions extending outwardly above the header plate; glass compression seals insulatively housing each of said terminal pins in an opening in said header plate; at least one pair of stationary contacts located at one end of said header plate, each of said pair itself being integrally formed from a continuation of one each of the outwardly extending portions of a pair of said terminals, said stationary contact pair including contact surfaces which are formed solely from the terminal pins themselves and each contact surface includes a rounded contact area lying in a contact plane which is parallel with and above the upper surface of the header plate, said rounded contact areas defined by the bent part of terminal pin bends located in the contact plane with the angles formed by the bends facing away from each other; a movable contact blade itself integrally formed from an outwardly extending portion of a terminal pin housed in an opening spaced away from said stationary contacts, said movable contact blade comprising a flattened end portion located in a plane transverse to said contact plane and having the movable end thereof positioned between the rounded contact areas of the stationary contacts, said flattened portion being bent in a biasing angle located in the flattened portion to maintain a normally closed contact condition between said movable blade and one of said contact surface areas and a normally open contact condition between said movable blade and the other contact surface area; an electrically energizable magnetic coil; a movable armature means carrying an insulative surface positioned to engage the movable contact and responsive to energization of said magnetic coil for altering the contact conditions of the relay structure; and a housing hermetically sealed to said header plate and covering said stationary and movable contacts, said magnetic coil means, and said armature means.

10. A method of fabricating a relay contact structure which comprises the steps of:
(a) preforming a cold-rolled terminal wire of predominately silver base and sufficient manganese to form an oxidized coating over the surface of the wire into a flattened contact blade which terminates at a right angle bend formed in the round terminal wire;
(b) bending a rounded angle in another terminal wire of the same material near the end of the terminal wire;
(c) permanently hardening and oxidizing the preformed terminal wires;
(d) housing, with a glass compression seal, the oxidized coated terminal wire at an airtight seal in an opening of a flat relay header plate with the flattened blade portion positioned above the plate and having the non-housed end free for pivotable movement; and
(e) additionally housing the other terminal wire in an airtight seal by a glass compression seal in an opening of the relay header plate with the bent portion of the terminal wire positioned adjacent the flattened side of the contact blade to alternately serve as an open and closed contact for the pivotably movable blade.

11. A method of fabricating a relay contact structure in accordance with claim 10 and comprising the additional step of:
(f) bending the flattened portion of the contact blade as a spring-loaded bias for normally holding the flattened portion of the blade in contact with the bent portion of the other terminal wire.

12. A relay contact structure comprising a flat header plate having at least two openings therein, at least two silver terminal wires each having an oxidized surface coating, a stationary contact means itself integrally formed as a weld and solder-free continuation of one terminal wire, and a movable contact blade itself integrally formed as a weld and solder-free continuation of another terminal wire, at least two glass compression seals, one each opening in the header plate for forming an airtight seal housing, the terminal wire portions of said stationary contact means and said movable contact blade in said header plate, said stationary contact blade having its non-housed end free for pivotable movement, and said stationary contact positioned adjacent to said pivotable blade as an open or closed contact therewith.

13. A relay contact structure in accordance with claim 12 wherein said silver terminal wires include sufficient manganese to form a magnesium oxide coating over the surface thereof, said oxide coating extending into and being compatible with said glass compression seals forming hermetically tight junctions in said header plate.

References Cited

UNITED STATES PATENTS

| | | | |
|---|---|---|---|
| 2,866,046 | 12/1958 | Pandapas | 200—164 |
| 2,923,794 | 2/1960 | Keeran | 200—87 X |
| 3,152,237 | 10/1964 | Richert et al. | 200—87 X |
| 3,154,653 | 10/1964 | Rowell | 200—87 |
| 3,172,975 | 3/1965 | Williams | 200—87 |
| 3,177,311 | 4/1965 | Torrico | 200—164 X |

ROBERT K. SCHAEFER, *Primary Examiner.*

H. O. JONES, *Assistant Examiner.*